Willard and Ross,
Mower.
No. 1780
Reissued Sept. 27. 1864.
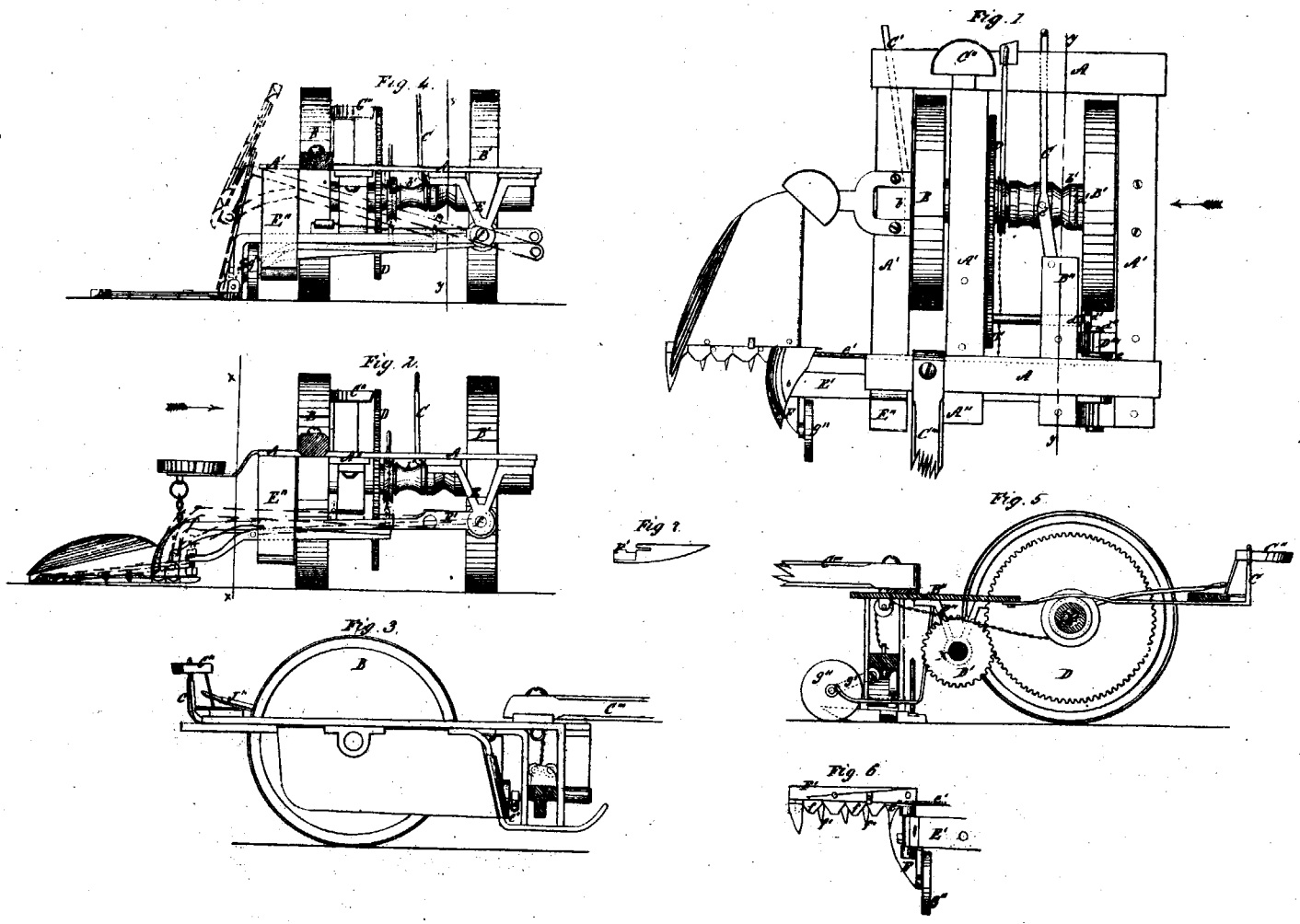
James A. Sayton
By his Attorney
Thos. H. Dodge
Witnesses
J. Henry Hill
Edgar T. Dodge

UNITED STATES PATENT OFFICE.

JAMES A. SAXTON, OF CANTON, OHIO, ASSIGNEE, BY MESNE ASSIGNMENTS, OF HOSEA WILLARD AND ROBT. ROSS.

IMPROVEMENT IN HARVESTERS.

Specification forming part of Letters Patent No. 18,562, dated November 3, 1857; Reissue No. 1,780, dated September 27, 1864.

*To all whom it may concern:*

Be it known that HOSEA WILLARD, of Vergennes, in the county of Addison and State of Vermont, and ROBERT ROSS, formerly of same place, but now residing at St. Albans, in the county of Franklin, in said State, invented certain new and useful Improvements in Grain and Grass Harvesting Machines, of which the following is a full, clear, and exact description, reference being had to the accompanying drawings, which make a part of this specification, and in which—

Figure 1 is a plan or top view, showing one mode of applying said improvements when the machine is to be used as a reaper. Fig. 2 represents a front view of Fig. 1 with the leading-wheel removed to show the parts in rear of it more fully, the coupling-arm, finger-beam, and platform being shown in different positions to illustrate the flexible connection of the finger-beam with the machine. Fig. 3 represents a section and side view of the machine on line *x x*, Fig. 2, when the parts are in the position shown in black lines. Fig. 4 represents in black lines a front view of the machine when arranged for mowing, and in blue and red lines two of the different positions which the finger-beam and cutting apparatus are made to assume when being prepared or folded for transportation. Fig. 5 represents a section on lines *y y*, Figs. 1 and 4, when the machine is arranged for mowing, as shown in black lines, Fig. 4. Fig. 6 represents a plan or top view of finger bar or beam F′, shoe F, leading-wheel *g″*, and part of the coupling-arm or finger-bar extension-piece E′; and Fig. 7 represents a side view of one of the fingers and an end or cross section of the finger bar or beam, showing how a part of the finger is made to rise up by the front edge of the bar to keep the cutter-bar from working forward.

The side of the machine which runs next to the standing grain I call the "inside," and that which runs next to the cut grass or grain I call the "outside."

In the accompanying drawings, the main frame, which is of rectangular form, is represented by the letters A A A′ A′. To the under side of the parts A′ A′ are fastened the bearings of the main shaft or journal of the driving and supporting wheels B B′. To the inner hub of the latter is fastened a ratchet wheel or device, *a′*, while a similar ratchet device, *a*, is fastened to the outer hub or side of wheel B. Wheels B B′, with their hub-ratchets, are fitted loosely on shaft X. A sliding ratchet wheel or device, *b′*, works on shaft X, and is so connected therewith as to be revolved when said shaft revolves, but is susceptible of a lateral movement, so that it can be moved in and out of action with ratchet *a′* by means of pin *c′* in lever C, whose front end is pivoted to the under side of piece B″, fastened to the front of the frame. Pin *c′* fits into a groove turned in the part *b′*, so that the part *b′* operates like a sliding revolving clutch. A similar ratchet or clutch, *b*, is fitted to be worked by lever *c′* on the outside of wheel B.

C″ is the driver's seat, which is fastened to the rear of main frame, and in such a position as that levers C and C′ are both within his reach.

As the machine is drawn forward by tongue C‴ (shown in section) wheels B B′ revolve, and when both or either of the clutches *b b′* are in action with their respective ratchets *a a′* shaft X is caused to revolve, together with cog-wheel D, fastened thereto, and which gears into cog-wheel D′ on a shaft, X′, supported at one end by hanger D″, depending from piece A″, and at the other in a projection, *d*, from D‴, in which the short crank-shaft turns, the latter having on its rear end a bevel-gear, *d″*, which is operated by bevel-gear *d′* on the end of shaft X′.

On the front end of the crank-shaft is fitted a balance-wheel, *e*, with a crank-pin, upon which is placed the outer end of the pitman *e′*, which gives motion to the cutter-bar *e″*, to which are attached teeth *f*, which work as they vibrate through slotted open fingers *f′*.

The improvements which form the subject-matter of this patent relate more particularly to that class of mowing-machines in which a flexible or double-jointed finger-beam is used, to facilitate the ease of movement thereof.

The nature of the invention consists, first, in arranging a leading or supporting wheel so as to run on a line in advance of the heel of the finger-beam and the inner shoe; second, in combining with said wheel an adjustable arm, whereby the heel of the finger-beam or the shoe, while the same can be made to run higher or lower, as occasion may require; third, in the combination and arrangement of the leading and supporting wheel $g''$, finger-beam F′, shoe F, and coupling-arm or finger-bar extension-piece E′, as shown in the drawings, whereby the wheel is allowed to run at the side of the shoe, while its adjustable arm is connected to the under curved side of the coupling-arm E′, thus rendering the arrangement compact and simple.

When the under side of the guard-fingers and finger-beam are allowed to slide in immediate contact with the ground too much friction is involved, as well as great liability of wear and tear. Various plans have heretofore been adopted to remedy these evils. Shoes shaped like sled-runners have been placed at the ends of the finger-beam to carry it very near to but not in contact with the ground. Although this somewhat lessened the evil, still it did not obviate the difficulty, since the friction between the shoes and the ground was found to be great, especially at the inner or heel end of the finger-beam, and to obviate which a wheel or roller was placed at the rear, and in some cases at the end of the finger-beam, to bear the weight of the heel end of the finger-beam. Wheels thus placed proved of much value, but still did not seem to obviate all of the objections, since in some cases they lifted the finger-beam and cutter too high or far from the ground, while in others the finger-beam was prevented from conforming, with the requisite freedom, to the inequalities and undulations of the ground, and in none did the wheel afford proper protection against the danger of the cut grass lying loosely in the path of the machine from being pushed forward by the shoe which supported the heel of the finger-beam, and as a consequence the cutter was often raised by bunches of cut grass thus pushed along, thus making balks in the cutting.

In the accompanying drawings, F is the inner shoe, to which the heel of the finger-beam is fastened. $g''$ is the leading and supporting wheel, which runs in contact with the ground on a line in advance of the sole of the shoe. It also runs at the side of the shoe, whereby its adjusting-arm $g'$ can be fastened to the under curved side of the coupling-arm E′, to which the shoe is hinged. As the machine advances the supporting or leading wheel treads down the loose grass in the path of the shoe, so that the shoe passes over the same very readily. The wheel also enables the finger-beam to be drawn over the ground very easily, since it takes the weight of the heel end thereof, and thus prevents excessive friction on the ground.

The mode of combining the wheel with the shoe deemed most preferable is by means of the arm $g'$, attached to the coupling arm or extension, as shown in the drawings, since arm $g'$ can by this mode be fastened at its rear at a point well up from the ground. Any other suitable mode may, however, be used, and the invention not limited to a wheel located at the side of the shoe. By loosening bolt $n$ arm $g'$ can be raised or lowered, so as to permit shoe F to rest with more or less weight on the ground or stubble. Coupling-arm E′, after passing through loop E″, by which it is sustained from being twisted back, extends along and is pivoted or hinged to a hanger, E, at $f$.

For a more full description of the machine represented in the drawings reference can be had to other patented divisions of even date herewith.

One mode of applying said improvements to practical use having been described or shown in this machine, what is claimed under this patent as the invention of the said WILLARD and ROSS is—

1. The combination of a leading-wheel with the inner shoe hinged to a coupling-arm, substantially as and for the purposes herein described.

2. The combination, with said shoe and leading-wheel, of an adjustable arm, for the purposes set forth, substantially as and for the purposes herein described.

3. The combination and relative arrangement of wheel $g''$, arm $g'$, finger-beam F′, shoe F, and curved coupling-arm or finger-bar extension-piece E′, substantially as described.

In witness whereof I have hereunto subscribed my name.

JAMES A. SAXTON.

In presence of—
GEO. E. BALDWIN,
S. SURBRUG.